United States Patent [19]

Morton et al.

[11] 4,028,484

[45] June 7, 1977

[54] ALFIN POLYMERIZED RUBBER

[76] Inventors: Avery A. Morton, 182 Standish Road, Watertown, Mass. 02172; Edward J. Lanpher, Rte. 111, E. Hampstead, Hampstead, N.H. 03826

[22] Filed: Sept. 18, 1975

[21] Appl. No.: 614,540

Related U.S. Application Data

[60] Division of Ser. No. 193,742, Oct. 29, 1971, abandoned, which is a continuation-in-part of Ser. No. 862,681, Oct. 1, 1969, abandoned.

[52] U.S. Cl. .............................. 526/335; 526/175; 526/340
[51] Int. Cl.$^2$ .............. C08F 136/06; C08F 236/06
[58] Field of Search ................... 260/83.7, 94.2 T; 526/175, 335, 340

[56] References Cited

UNITED STATES PATENTS

| | | | |
|---|---|---|---|
| 3,197,448 | 7/1965 | Gavlin | 526/175 |
| 3,418,297 | 12/1968 | Grinninger | 260/83.7 |
| 3,422,080 | 1/1969 | Hedman | 260/94.2 T |
| 3,449,469 | 6/1969 | Maringer | 260/83.7 |
| 3,518,238 | 6/1970 | Onishi | 260/83.7 |
| 3,649,606 | 3/1972 | Watson | 260/94.2 T |
| 3,718,637 | 2/1973 | Halasa | 260/83.7 |
| 3,728,323 | 4/1973 | Cheng | 260/83.7 |
| 3,868,344 | 2/1975 | Newberg | 260/94.2 T |

*Primary Examiner*—Paul R. Michl
*Attorney, Agent, or Firm*—Kinzer, Plyer, Dorn & McEachran

[57] ABSTRACT

The effectiveness of an alfin catalyst and the quality of the rubber it produces are increased by carrying out the polymerization in a closed container in which the ratio of vapor to liquid space is less than 0.2, this ratio being responsible for a reduction of the boiling (desorption of monomer) that occurs on each particle because of the heat of polymerization. In general the effectiveness of the catalyst and the quality of the polymer are improved by any method or combination of methods that reduces the boiling per particle to a level less than that achieved by carrying out the reaction in a closed container in which the volume of vapor space to liquid is less than 0.2. The more this reduction, the better the product as a rule.

The product obtained is a millable rubber of high molecular weight, well above that of natural rubber and primarily with a trans structure of the diene component. This fact was demonstrated with a styrene:butadiene proportion of around 30:70, polymerized under a combination of influences that restrained boiling. The polymer compounded readily, that is to say, the rubber banded on a warm mill and compounded easily in a conventional recipe. Rubbers with an intrinsic viscosity near 13, having a high proportion of the diene in a trans structure, when compounded had a tensile-elongation of around 260 Kg/cm$^2$–500%.

This unique achievement is possible because the polymerization is in an heterogeneous system, where adsorption on a solid surface and deposit of the product thereon dominate the reaction. The situation contrasts with conventional polymerizations in homogeneous systems where solution is a major factor.

1 Claim, 3 Drawing Figures

FIG.1

Yield in grams per milliliter of catalyst vs / DSV. The number next to each point is the number of the experiment Table-I Line of equal yield per ml. of catalyst see FIG.2

FIG.2

Figure 1:
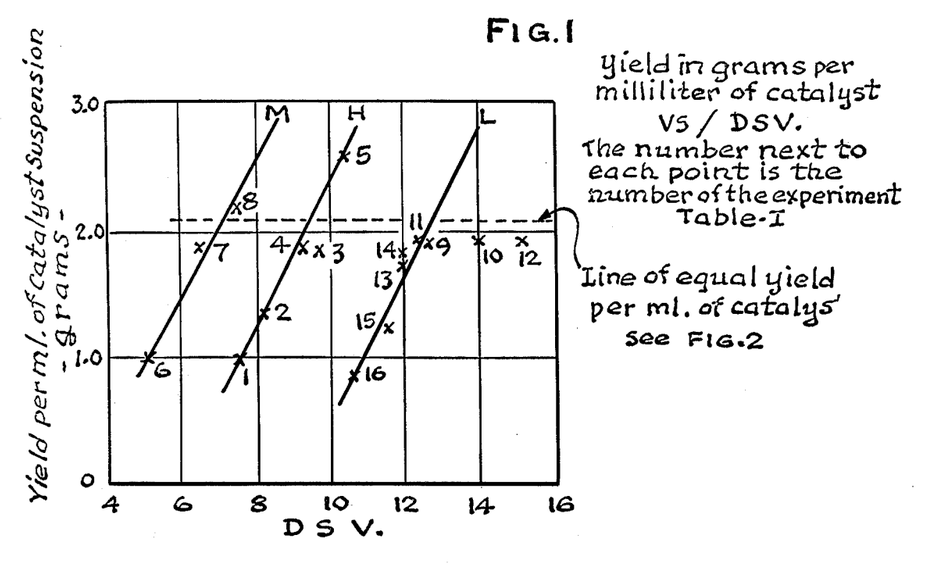

DSV. vs $\ell/v$ at equal yield per ml. of catalyst. see FIG.1

ALFIN POLYMERIZED RUBBER

This is a division of application Ser. No. 193,742, filed Oct. 29, 1971 now abondoned. Ser. No. 193,742 is a continuation-in-part of application Ser. No. 862,681, filed Oct. 1, 1969 now abandoned.

This invention relates to the production of synthetic rubbers by means of alfin catalysts. Because more rubber per each catalyst particle is produced and because better rubber can be made than in all previous work with these catalysts, the products from this invention will be called alfin plus rubbers.

Alfin rubbers are notable for their high molecular weight, as suggested by dilute solution viscosity, and for the high proportion trans-1,4-structure.

One or both of these features makes the rubber very tough. In a finished product, such as a tire, toughness can be desirable, for it improves resistance to wear and to oxidative breakdown, but these properties hinder degradation to the plastic state. Practical compounding is impossible. To overcome this disadvantage large quantities of oil, as much as an equal weight, have been incorporated in gel-free alfin polybutadiene; such amounts are excessive and troublesome. In other attempts copolymers of styrene with butadiene have been prepared by D'Ianni et al, Ind. Eng. Chem. 42 95 (1950), and by Stewart and Williams, Ibid., 45 173 (1953), without finding a mixture that compounded suitably and was useful. Neither did preparations in oil by Stewart and Williams solve the problem. Recently a copolymer of butadiene with butene-2 has been alleged to form (Hedman and Hubbard, U.S. Pat. No. 3,422,080, Jan. 14, 1969) but that product has so far failed to satisfy commercial requirements. Some success in reducing toughness has been achieved by the presence of dihydronaphthalene or other moderators, which shortens the chain during polymerization as reported by Hansley and Greenberg, Rubber Chem. and Tech., 38 103 (1963), but the product, though extensively publicized, has little practical interest. Moreover, that procedure destroys one of the unique features of alfin catalysis, namely, the formation of extremely long chains with minimum gel. The present disclosure reveals a way to achieve plasticity without sacrifice of the long chains.

We have found a way to obtain additional and unique activity in an alfin catalyst. The yield is increased, high molecular weight is retained, and some change in the microstructure of the butadiene component is achieved as demonstrated in the formation of styrene-butadiene copolymers, approximately 30:70. Thus a rubber can be made that is millable in the practical sense with a conventional specification of ingredients. Possibly the crystalline condition of the old alfin rubber, as described by Feu, Reynolds, Fryling and McMurray, J. Polymer Science, 3 465 (1948), and by D'Anni et al, (loc. cit.) is eliminated. That condition might be blamed for crumbling and failure to band on a mill. An amorphous material should soften and band more easily. In any event the polymer bands in spite of an extremely high dilute solution viscosity (DSV), two to five times higher than for any rubber now used in tires.

This novel result was first observed reducing the vapor space above the liquid in the reaction vessel, thereby making available a new plateau of activity where by proper operation, a high quality rubber can be obtained. The effect is pronounced when the vapor/liquid ratio, hereafter called the v/l ratio, is around 0.15 or less, On this new plateau of alfin activity the yield per catalyst particle is higher, the DSV is increased and the microstructure is changed a little. Millability is improved. An effect is less evident, though underway, when the ratio is 0.3.

This disclosure will describe first the experimental method and the steps leading to the discovery of the v/l effect. Next it will discuss the change in the microstructure of the polymer made at a low v/l ratio. Then it will show how to obtain a high quality product on this new plateau of alfin activity. In turn, good and simple explanations for each of the special features will be presented. Some unique properties that distinguish this product from other rubbers will be described. Some obvious equivalents and applications of the invention will be considered.

EXPERIMENTS PERTINENT TO THE DISCOVERY

The conditions of polymerization were in general those described by Morton in Solid Organoalkali Metal Reagents, Gordon and Breach, Inc., New York, 1964. Other references are: Encyclopedia of Polymer Science and Technology, Vol. I, Interscience Publishers, Inc., New York, 1964, p. 629; Advances in Catalysis, Vol. IX, Academic Press, Inc., New York, 1957, p. 743; Proc. 3rd. Rubber Technology Conference, Heffer, Cambridge, England, 1954, p. 108; Ind. Eng. Chem., 42 1488 (1950). and J. Am. Chem. Soc., 72 3785 (1950).

A common technique in making alfin polymers is to add 5 ml. of catalyst suspension to 30 ml. of butadiene in 200 ml. of pentane in a 12 oz. tonic bottle. We were following that practice except for (1) the addition of enough styrene to make a monomer mixture of 30:70 or 20:80 styrene-butadiene ratio and (2) the use of 10 ml. of catalyst suspension, a larger amount of catalysts being usually needed for a copolymerization of styrene and butadiene. Also some catalysts of only moderate activity were being tested at the time of the discovery. For simplicity of definition we shall call this combination of quantities and container an M (signifying medium) condition. All polymers prepared under this M condition crumbled on the mill rather than banded.

Next, we happened to try the reaction with the same quantities of reagents but in a 32 oz. instead of a 12 oz. bottle. The yield per given catalyst was less and the polymer had a higher DSV. This condition of quantities and container will hereafter be referred to by the letter H, meaning high v/l ratio.

Because of the general rule that millability is better the lower the DSV, and because the DSV under the M condition had been lower than under the H condition, we tested an L condition, that is, where the v/l ratio was low. This was done by the use of 25% more pentane and monomers, but with the same amount of catalyst, in the 12 oz. bottle. This time the yield increased, but most unexpectedly the DSV increased to a value higher than found in the previous tests. Moreover the rubber crumbled only slightly on a cold mill and banded nicely on a hot mill. In additional experiments it did not crumble at all and banded as the mill warmed.

CONSIDERATION OF THE EVIDENCE FOR A V/L EFFECT

Table 1 records the significant experiments that led to the discovery and showed the way to improvement of the product. They are in the order of increasing yield, first by the condition H,M and L in column 2, and thereafter within each group as shown in column 9, save for Nos. 15 and 16 near the end. With a given catalyst or pair of catalysts, other factors being equal, the yield increased as the v/l ratio decreased. For example, the yield was higher in No. 8 than in No. 2, and polymerization by the $A:A_n$ pair of catalysts was almost entirely by the $A_n$ catalysts, judged by calculations with simultaneous equations for No. 1, 2 and 3. The same use of simultaneous equations with reactions No. 4 and 5 also showed $A_n$ more than eight-fold superior to A. Therefore, No. 9, made with only the much less active catalyst A, yet in almost the same yield as No. 8, must rate better than No. 8 in which half of the catalyst mixture was the far better catalyst, $A_n$. Also this arrangement shows the great change in the character of the process between conditions M and L. The DSVs, which reasonably were expected to be lowest under the L condition, were actually higher than under the H condition, and the product from L banded rather than crumbled. Obviously, a new and more active plateau of alfin activity had been found, and we shall show later how and why variations in the amount of catalyst, time of reaction, and the initial temperature, such as would be a part of any study of optimum conditions, cause further changes in millability or DSV.

Table 1

Styrene-Butadiene (S:B) Copolymers Made Under Conditions H, M and L

| Exp't No. | v/l Cond. | Factor Ratio | Catalysts Type[a] A:An | Vol. Ratio[b] | ml. | Time min. | Monomer comp. (S:B) | Yield[c] g. | DSV | Gel % | Mill[d] |
|---|---|---|---|---|---|---|---|---|---|---|---|
| Alfin Rubbers | | | | | | | | | | | |
| 1 | H | 2.8 | $A:A_n$ | 2:1 | 10 | 60 | 30:70 | 10 | 7.6 | 10 | C. |
| 2 | H | 2.8 | $A:A_n$ | 1:1 | 10 | 60 | 30:70 | 14 | 8.2 | 21 | C. |
| 3 | H | 2.8 | $A:A_n$ | 1:2 | 10 | 60 | 30:70 | 19 | 9.7 | 11 | C. |
| 4 | H | 2.8 | $A:A_n$ | 2:1 | 10 | 60 | 20:80 | 19 | 9.2 | 19 | C. |
| 5 | H | 2.8 | $A:A_n$ | 1:1 | 10 | 60 | 20:80 | 26 | 10.3 | 30 | C. |
| 6 | M | 0.42 | $P_n:A_n$ | 30:1 | 10 | 60 | 30:70 | 10 | 5.1 | 25 | C. |
| 7 | M | 0.42 | $P_n:A_n$ | 10:1 | 10 | 60 | 30:70 | 19 | 6.8 | 30 | C. |
| 8 | M | 0.42 | $A:A_n$ | 1:1 | 10 | 60 | 30:70 | 22 | 7.5 | 13 | C. |
| Alfin Plus Rubbers | | | | | | | | | | | |
| 9 | L | 0.15 | $A^{(e)}$ | | 10 | 60 | 29:71 | 21 | 12.7 | 15 | B-h[f] |
| 10 | L | 0.15 | $A:A_n$ | 50:1 | 10 | 60 | 29:71 | —[g] | 13.9 | 21 | B-h[f] |
| 11 | L | 0.15 | $A:A_n$ | 22:1 | 10 | 60 | 29:71 | 21 | 12.7 | 21 | B-h[f] |
| 12 | L | 0.15 | $A:A_n$ | 13:1 | 10 | 60 | 29:71 | 21 | 15.1 | 21 | B-h[f] |
| 13 | L | 0.14 | A | | 12 | 52 | 29:71 | 22 | 12.0 | 35[h] | B-w[i] |
| 14 | L | 0.14 | A | | 14 | 45 | 29:71 | 26 | 11.9 | 47[h] | B-w[i] |
| 15 | L | 0.14 | A | | 12 | 65 | 29:71 | 16 | 11.5[j] | 15 | —[k] |
| 16 | L | 0.14 | A | | 12 | 75 | 29:71 | 11 | 10.7[j] | 32 | —[k] |
| 17[l] | L | 0.11 | A | | 15 | 40 | 29:71 | 34 | 11.9 | 11 | B-h |

Footnotes to Table 1

[a]Four different catalysts were prepared for the work reported in this table but only three were used in the polymerization tests. A signifies allylsodium. That reagent, associated with sodium isopropoxide and sodium chloride, is the most common of the alfin catalysts. It was prepared by metalation of propylene with amylsodium in the manner described in the literature, particularly the first and last references of the first paragraph of this section. The amount of alkoxide was 0.85 mole per preparation of anylsodium from 3 g. atoms of sodium and 1.5 moles of n-amyl chloride in pentane. The preparation was diluted with pentane to a volume of 2600 ml.

$A_n$ signifies that an allylsodium catalyst was suspended on naphthylsodium. Naphthalene equivalent to 50% of the allylsodium present in an A catalyst was added. The mixture was allowed to stand at least a few days with frequent shaking before use. This catalyst was eight or more times as active as A.

P signifies that the catalyst contained pentenylsodium instead of allylsodium. It was made in the same manner as A except that pentene-2 was added instead of propylene to amylsodium. This catalyst had very low activity and was not used except for preparation of the $P_n$ catalyst.

$P_n$ signifies that naphthalene was added to the pentenylsodium catalyst in the same way as in the making of the $A_n$ catalyst. Immediately after the addition of naphthalene no great change in the activity seemed to have taken place. But after several months the activity was greatly increased. Even then, its activity was less than that of the A catalyst.

The A and $A_n$ catalysts were freed from unused propylene by centrifuging and replacement of the liquid layer with dry pentane. This washing was repeated once. At first this removal of excess propylene seemed desirable in order to prevent possible changes of the surface during polymerization. Propylene is metalated very easily. If a mixture of A and P catalysts should be used, the excess propylene in A would probably cause the P catalyst to change to allylsodium during a polymerization. Moreover the product of chain growth is a polymersodium compound, which might metalate free propylene and form allylsodium in some undesired spot. Finally a constant interchange of propylene with allylsodium to form allylsodium and propylene respectively might disturb the surface considerably. Such changes could alter the size and number of dense areas on a particle. The elimination of all possible side effects and the confinement of all action to polymerization, as far as possible, seemed at the beginning a wise precaution for the proper control of the reaction. In later work however this step was found unnecessary as far as concerns an allylsodium catalyst.

[b]The ratios are in the same order as the components of the catalyst in the previous column. If only one catalyst were used, no numbers appears in this column. At the beginning of the study, mixtures were used in order to get a wide range of molecular weight in the product. Supposedly millability would be easier if a large number of short chains were present and the P or $P_n$ catalyst was supposed to form such chains. Subsequently good millability was found with just one catalyst when the v/l ratio was very low.

[c]This column shows the yield of dry polymer obtained after the customary decomposition of the reaction mixture with alcohol, washing with water, and drying under vacuum.

[d]This column shows the millability. C signifies that the polymer crumbled and did not band. B signifies that the polymer banded on the mill; h and w mean that the mill was hot or warm respectively.

[e]Eight of these experiments, Nos. 9 to 16 inclusive in the L condition, are used also as examples of this invention. When each bottle was opened at the conclusion of each preparation, the contents did not explode violently from the bottle as a swollen mass that is typical of preparations under the M condition when the yield is appreciable. Instead a sticky, viscous mass oozed or expanded from the bottle.

[f]The four polymers marked by this symbol crumbled slightly but banded on a hot mill.

[g]Part of this preparation was lost but the yield was probably 21 g. The presence of tiny amounts of $A_n$ catalyst did not affect the yield when the A catalyst was in huge excess. Probably the differences in activity between the two catalysts, which could be observed under the M and H conditions, became minimized under the L condition. The two catalysts became more nearly the same with the general increase in yield.

[h]Note the extremely high gel content of these two samples. Yet the samples masticated without crumbling and banded as the mill warmed.

[i]After milling, the gels were 21% and 17% respectively for these two samples. The DSVs had fallen to 6.5 and 7.1 respectively.

[j]In these preparations the initial temperature was much lower than in the other experiments. Indeed, it was so low that polymerization appeared to stop after approximately 30 minutes. Although shaking was continued for a longer time the reaction mixture never set to even a loose jelly, but remained a mush. It was feared that the experiment was a failure, but the recovered rubber had nearly as high a DSV as the others. Neither were the yields extremely low. In general these two experiments showed the way to a high quality rubber, namely, by starting the reaction at a low temperature and using enough catalyst to sustain the reaction to the desired yield. These precautions proved successful in the case of Example No. 9 and the subsequent examples, where the rubbers banded and compounded nicely on a small, but standard, laboratory mill.

[k]The samples did not crumble but the amount of rubber was too small to make a band on the micro mill.

[l]For this preparation and four others like it, called No. 17, the bottles were 90% filled. The increase in activity was greater than expected.

Table 1-continued

Styrene-Butadiene (S:B) Copolymers Made Under Conditions H, M and L

| Exp't No. | v/l Factor Cond. Ratio | Catalysts Type[a] A:An | Vol. Ratio[b] ml. | Time min. | Monomer comp. (S:B) | Yield[c] g. | DSV | Gel % | Mill[d] |
|---|---|---|---|---|---|---|---|---|---|

The reactions were terminated after forty minutes. The yields were very high. The recovered rubber was tougher than any others in the series of alfin plus preparations. The obvious way to improvement was to start the reaction at a lower temperature, and that was done in the later experiments, e.g. Example No. 9 seq.

Somewhere between the M and the L groups a minimum DSV or turning point exists. That position can be estimated by means of two graphs. In FIG. 1 the DSVs are plotted against the yields per milliliter of catalysts. Points for preparations under the H condition fall near or on a straight line, regardless of the proportions in the mixture of catalysts or of the proportions of styrene and butadiene in the monomer mixture. Also a straight line relationship is found for the three preparations under the M condition. So it is clear that the v/l factor affects the positions of the H and M lines, at least within the limits here tested.

The line for the preparations under the L condition was expected to be on the left side of line M. Surprisingly, it was on the right side of line H. Two of the points do not fall on the straight line, possibly because the vapor volume becomes a more critical feature as the v/l ratio becomes less and less.

Figure 2:
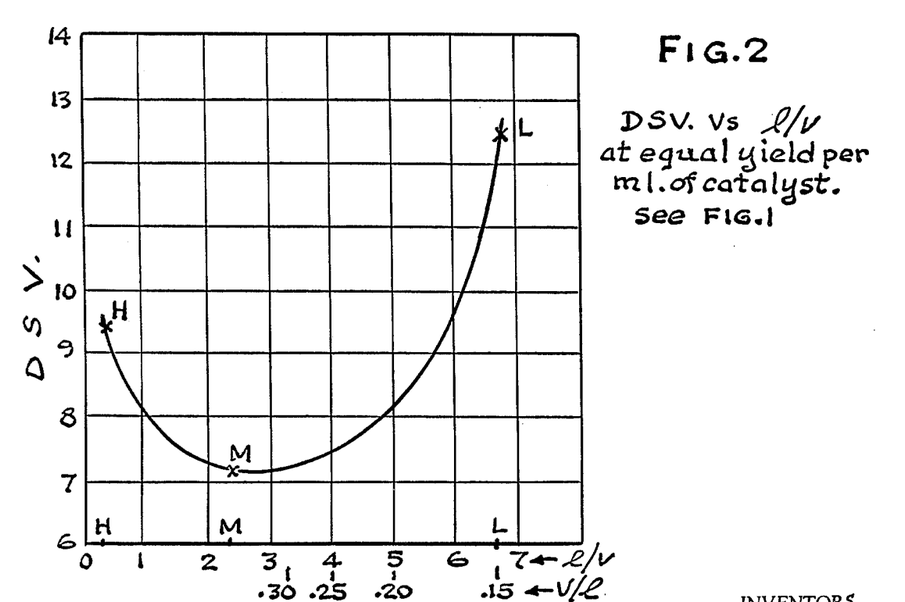

In the second graph, FIG. 2, for each condition, H, M, or L, the DSV at a given yield — say 2.1 g. per ml. of catalyst as shown by the horizontal dotted line line the first graph — is plotted against the reciprocal of the v/l ratio. Thus the change appears definitely underway at a v/l ratio of 0.3.

CHANGE IN THE MICROSTRUCTURE

Table 2 shows that the amount of trans structure is lower in alfin plus than in alfin, with some overlapping. The amounts of vinyl structure and of trans/vinyl ratio are higher in alfin plus than in alfin. These changes are not surprising as will be explained later. The amounts of these changes probably depend on the alfin catalyst used, because the trans/vinyl ratio varies considerably with composition as shown by Morton, Nelidov and Schoenberg, (loc. cit.). Therefore no fixed limits and specification in microstructure seem possible, but the order will be trans>vinyl>cis.

Table 2

Microstructure and Trans/Vinyl Ratio of Alfin and Alfin Plus Polymers

| Polymer | Cis-1,4-% | Trans-1,4-% | Vinyl % | Trans/Vinyl |
|---|---|---|---|---|
| Alfin[a] | 10 | 70 | 20 | 3.5 |
| Alfin-R |  | 71 | 18 | 3.9 ⎤[b] |
| -B |  | 69 | 26 | 2.7 |
| -M |  | 64 | 20 | 3.2 ⎦ |
| Alfin-max. | 2 | 76 | 22 | 3.5 ⎤[c] |
| -min. | 11 | 63 | 25 | 2.5 ⎦ |
| Alfin[d] |  |  |  | 2.8–3.0 |
| Alfin plus Exp't No.[e] 17 | 9 | 64 | 27 | 2.4 |
| 9 | 16 | 54 | 30 | 1.8 |
| 10 | 17 | 52 | 31 | 1.7 |
| 11 | 18 | 52 | 30 | 1.7 |
| 12 | 18 | 53 | 29 | 1.8 |
| Example No. 9 | 6 | 65 | 29 | 2.2 |
| 10 | 6 | 66 | 29 | 2.3 |
| 11 | 9 | 64 | 27 | 2.4 |

Footnotes to Table 2
[a] Composition cited by Hansley and Greenberg (loc. cit.).
[b] Compositions listed in the paper by Morton, Nelidow and Schoenberg, Proc. 3rd. Rubber Technology Conference, Heffer, Cambridge, Eng., 1954, p. 110. In this case the same sample was measured by three different laboratories, R, B and M, with three different results. The purpose was to observe the variations possible in this type of measurement.
[c] The maximum and minimum values are for trans structure as recorded in Table A-1 of the paper by Bahary et al., Rubber Chem. and Tech., 40 1529 (1967).
[d] This range of trans/vinyl ratio is given in the paper presented by Newberg, Greenberg and Sato at the 96th meeting of the Rubber Division, A.C.S., Oct. 1969.
[e] The numbers are for the preparations as listed in Table 1.

VARIATIONS IN THE QUALITY OF ALFIN PLUS POLYMERS

While all preparations on this new plateau of activity showed less tendency to set to a stiff jelly during polymerization than has been experienced in the past, some, that formed seemingly the softest rubber, had not set to a jelly at all, when the reactions were 35 and 47% complete. Also the recovered rubbers did not band with equal ease. Some banded only on a hot mill. Others masticated on a cold mill and banded as the mill warmed. We have deduced, as shown in Table 3, that the decreased tendency to set to a stiff jelly, the ease of banding, and the lower proportion of trans structure, as far as these items have been observed, are generally in the order of decreasing ratio of yield per catalyst, hereafter referred to as the Y/C ratio. In other words the lower this ratio, the easier the banding and compounding other factors being equal. We will give a logical explanation for this order in quality later.

A suitably low Y/C ratio will vary with the composition of the catalyst and probably with its physical condition, such as particle size and also with monomer composition. But for any catalyst and the condition of its use, the quality will improve as the amount of catalyst used for a given yield is increased. This emphasis on a low Y/C ratio must not be construed as a declaration that other factors, such as a lower DSV, have no influence. A suitably low Y/C value is needed to get on an area of this new plateau where the product, a high DSV polymer, compounds nicely. Within that area other factors, commonly known to affect compounding, undoubtedly have an influence too.

Table 3

Arrangement of the Preparations under the L Condition in the Order of Increasing Quality as Judged by the Decreasing Ratio of Yield/Catalyst

| Preparation No.[a] | Yield g. | Catalyst ml. | Y/C Ratio | Trans % | Mill | Jelling During Polym. |
|---|---|---|---|---|---|---|
| 17 | 34 | 15 | 2.26 | 64 | hot |  |
| 9 | 21 | 10 | 2.10 | 54 | hot |  |
| 10 | 21 | 10 | 2.10 | 52 | hot | ⎤[b] |
| 11 | 21 | 10 | 2.10 | 52 | hot | |
| 12 | 21 | 10 | 2.10 | 53 | hot | ⎦ |

Table 3-continued

Arrangement of the Preparations under the L Condition in the Order of Increasing Quality as Judged by the Decreasing Ratio of Yield/Catalyst

| Preparation No.[a] | Yield g. | Catalyst ml. | Y/C Ratio | Trans % | Mill | Jelling During Polym. |
|---|---|---|---|---|---|---|
| 14 | 26 | 14 | 1.87 | | warm | |
| 13 | 22 | 12 | 1.83 | | warm | |
| 15 | 16 | 12 | 1.33 | | | None |
| 16 | 11 | 12 | 0.91 | | | None |

Footnotes to Table 3
[a] Same numbers as in Table 1.
[b] The experimental conditions for these three rubbers were the same as for No. 9 except that mixtures of catalyst were used. One catalyst was the normal combination of allylsodium, sodium isopropoxide and sodium chloride. The other was similar except for being supported on naphthylsodium. Only very small amounts of the supported catalyst were used as recorded in Table 1. The yields were unchanged but in two cases the DSVs were 13.9 and 15.1 instead of 12.7 as in No. 9. Also the gel contents were higher than in No. 9. These three banded less readily than No. 9 although the Y/C values were the same. Changes in composition of the catalyst make any comparison between series on the basis of Y/C values uncertain or impossible. In this case the Y/C values of these three preparations would have to be lowered by the use of more catalyst, other factors being equal, in order to get banding equal to that in No. 9.

EXPLANATION OF THE INCREASED YIELD

The increase in yield or activity comes from more surface being made available for polymerization because of a reduction of the amount of boiling that occurs on each particle. That conclusion has to be true because any polymerization that occurs on the surface also generates heat on that spot; and heat causes some of the butadiene that is absorbed there to boil off (be desorbed) and escape into the vapor space. In other words the solid particles of catalyst not only serve as the locale of polymerization, but also as boiling stones — many thousands of them — from which the diene distills into the vapor space. Obviously the amount that distills and builds up pressure there is greatest for the largest volume, i.e., for the H condition, less for the M condition, and least for the L condition. In other words when the v/l ratio is very low, more butadiene remains on the surface and enters into polymer growth. Therefore, overall, the yield must increase. That would be true even if no structural change in the polymer took place.

Figure 3:
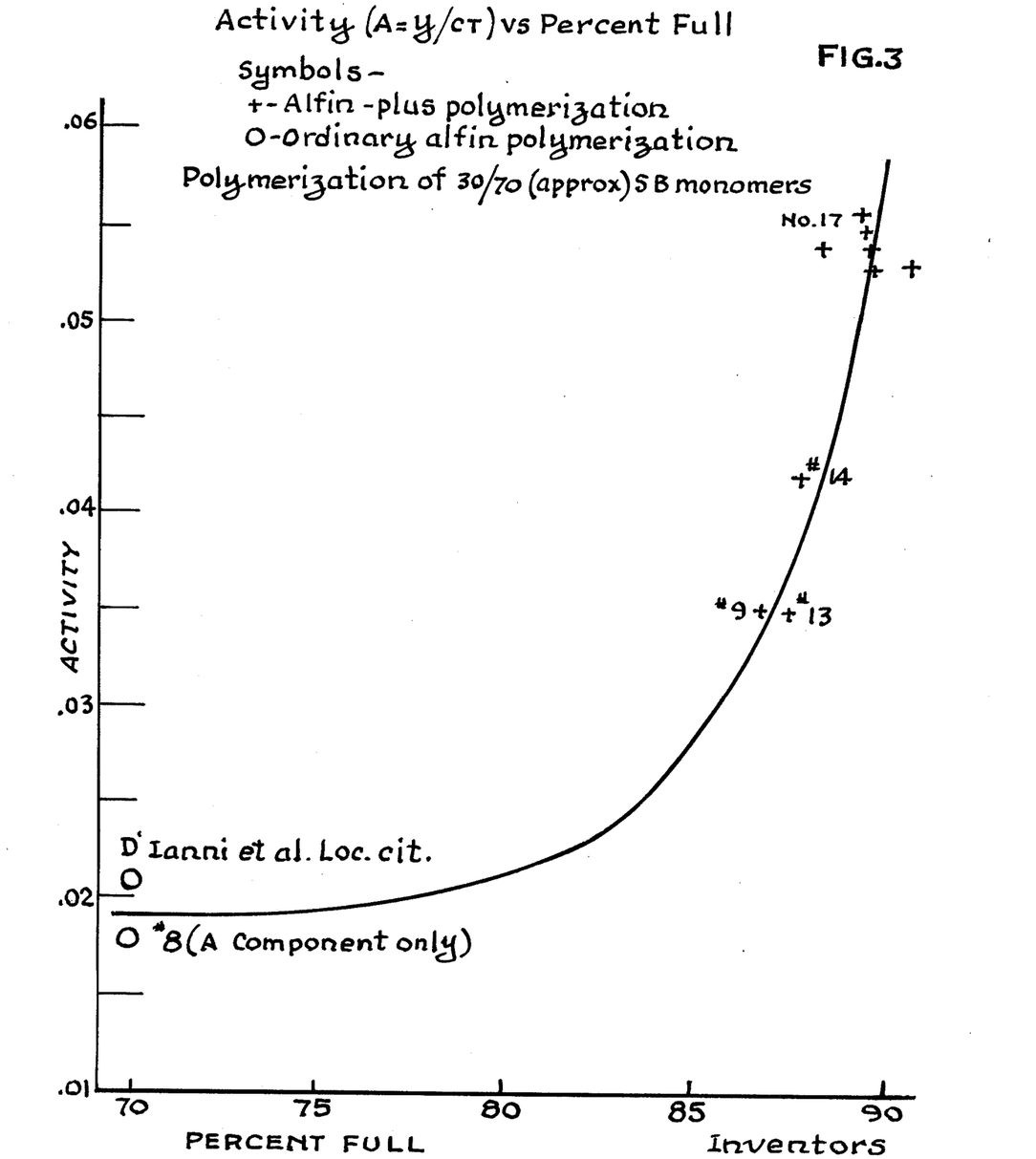

The increase is shown graphically in FIG. 3 where the activity, A, is plotted against the percentage of liquid phase in the container. The activity, A, is defined as the yield per unit quantity of catalyst per unit of time; it is calculated by the equation $A = Y/CT$ where Y, C, and T are respectively the total yield in grams, the milliliters of catalyst suspension, and the reaction time in minutes. The graph shows that the activity is rising rapidly when the container is 87–90% full. The increase in activity is 200–300%.

EXPLANATION OF THE CHANGE IN MICROSTRUCTURE

A reason for a change in the microstructure of the butadiene component of the polymer also seems obvious. The ideal proportions of the three salts in even the most typical catalyst — namely allylsodium, sodium isopropoxide and sodium chloride — are not known. No ternary salt complex has ever been crystallized. Probably, as argued by Morton, Solid Organoalkali Metal Reagents, Gordon and Breach, Inc., New York, 1964, pp. 167–181 and also in Advances in Catalysis, IX, Academic Press, Inc., New York, 1957, p. 143, some areas on the surface have an arrangement of the three salts that promotes the fast chain growth to high molecular weight for which the catalyst is unique. Other areas are not so favored. Therefore a reasonable assumption is that at least a part of the additional activity — the plus activity in this invention — must be on those areas that do not have the three components ideally positioned. In the extreme case of poor positioning, an allylsodium might not be associated with the other two salts. Any polymerization on such an area could well yield a product with a microstructure similar to Buna rubber, where the proportions of cis, trans, and vinyl structure are respectively 20, 40, and 40. It might be increased even more if boiling were repressed further by means to be described later.

In other words a trend toward a propostion of structures similar to that in Buna rubber might be expected and does indeed appear to exist, for the percentage of vinyl increases some. However, alfin plus is not a mere mixture of alfin and Buna rubbers. Buna rubber has a low DSV (2.1) and chain growth is slow. The DSV for the 30:70 SB alfin copolymers observed by D'Ianni et al. and Stewart and Williams (loc. cits.) was around 8.5. Chain growth was rapid. So a simple binary combination of the two rubbers would have to be intermediate between the two extremes. The DSV of alfin plus 30:70 SB copolymer is around 10 or more and chain growth is more rapid. So, if any true Buna is present, the amount should be very small.

However that may be, the proportions of trans and vinyl structures have changed a little in accord with the view that adsorption and polymerization occur on areas other than the ternary combination of salts needed for alfin polymerization. These other areas may be binary salt combinations. And some may consist only of allylsodium with itself. Thus adsorption can be different and correspondingly the micro structure is different. The polymer, overall, becomes more heterogeneous, more amorphous. The DSV distribution range is probably increased and might even include a portion that is very low, with a microstructure that is identical with Buna rubber.

EXPLANATION OF THE IMPROVEMENT IN MILLABILITY

Several reasons for improved millability can be mentioned, and all may have an influence. Any Buna component would help. Blumel on p. 421 of Rubber Chem. and Tech., 37 408 (1964) noted that in milling behavior and extrusion, Buna, in spite of its high gel content, was nearly as good as natural rubber.

Another factor is a decrease in the proportion of trans structure and a more amorphous character of the polymer. The trans structure softens and melts higher than the other forms. It crystallizes readily as noted earlier in this discussion. So any lowering of the amount of trans structure would also lower the softening and melting points proportionately. In turn milling would be easier.

A third factor is the probable increase in the higher end fractions. Bueche in J. Applied Polymer Science, 4 101 (1960) has correlated some facts that support the idea that high molecular weight fractions in cold rubber and natural rubber facilitate shear breakdwon on the mill. Alfin plus rubber probably has an increased proportion of such chains because the average DSV is increased.

EXPLANATION OF THE RELATIONSHIP OF Y/C VALUES TO MILLABILITY

To understand the role of the Y/C ratio we must consider the unique situation that exists in a heterogeneous process operating in a medium in which the product is insoluble or very slowly soluble. The polymer cannot dissolve and get away from the spot where it forms, so it deposits on the surface. It surrounds the catalyst particle with an ever thickening shell of rubber as the reaction progresses. The volume of this shell is very large compared with the volume of the particle. For example, in preparation 17, where the yield was around 90%, the volume of rubber shell was around 75 times that of the particle. And in experiment 15, where the product was of fair to good quality the shell/particle volume ratio was around 37. These estimations are on the low side, for the rubber is swollen by the hydrocarbon medium. Easily the shells could be twice larger than estimated.

Monomer can penetrate this rubber shell, reach the surface, and maintain polymerization. But the polymer product is too large to penetrate the shell in the reverse direction. Thus the shell becomes thicker and thicker. It presses and strains against the growing point.

Unfortunately the rubber shell also insulates the surface from the cooler medium. Therefore the surface, where polymerization is occurring, becomes hotter and hotter as the shell thickens. One result is that adsorption is affected. Only the most stable form — almost certainly the trans form in a two point adsorption — can remain adsorbed and participate in chain growth. Also the higher temperature should cause side reactions such as inter- and intra-molecular cross linking, branching, and rearrangement of cis to trans. In general the polymer probably becomes worse in every way possible.

The volume of the shell will be proportional to the yield per catalyst. For any given series the quality of the product is generally better the lower this ratio. So one obvious way to improve the quality is to increase the amount of catalyst. Of course the reaction time will have to be reduced correspondingly if the yield is to remain constant. Or the starting temperature will have to be reduced appreciably if the process is adiabatic and the yield is to remain the same. Or the bath temperature will have to be lowered if the time and yield is to be unchanged in a process that overall is intended to be isothermal; although it seems difficult to maintain a truly isothermal condition on the surface under the rubber shell, especially in the early phases of the extremely fast reaction. But a lower temperature at the start or, overall, during polymerization should help to produce a generally superior product, if the experience in making cold rubber is any criterion.

The use of more catalyst lowers the boiling per particle, too. For example if we double the amount of the catalyst in the suspension but keep the yield and the vapor space constant, the total amount of heat produced and the amount of monomer distilled into the vapor space must remain the same. But only half as much diene will be distilled from each particle. In other words more area on each particle will be left available for polymerization as the amount of catalyst is increased, other factors being equal.

Obviously if enough catalyst were used, the boiling per particle would be reduced as much as by reduction of the v/l ratio. To do that, however, would require an excessive amount of the relatively expensive catalyst. Suppose, for simplicity sake, that 100 ml. of catalyst is needed to get a certain amount of high quality rubber from a given amount of butadiene when a liter apparatus is 90% full. For each liter the boiling per particle, B, will be directly proportional to the amount of vapor space, $V = 100$ ml., and inversely proportional to the amount of catalyst suspension, $C = 100$ ml., and obviously also, to the amount of pressure, $p = 1$ atm. Under these conditions $$B \alpha \frac{V}{C(P)} \text{ becomes } B \alpha \frac{100}{100(1)} \text{ or } 1.$$

But if the apparatus were only 70% full ($V = 300$ ml.) which is approximately the practice in previous alfin polymerizations, the same ratio would have to be attained by tripling the amount of catalyst, $$B \alpha \frac{300}{300(1)} \text{ or } 1.$$

As a practical, economical and advantageous operation, the container would be operated at 90% or more full. Pressure would be applied as will be discussed later. And the amount of catalyst would be kept as low as possible, consistent with the quality desired.

UNIQUENESS OF THE ALFIN PLUS RUBBERS AND OF THE METHOD OF THEIR PREPARATION

Table 4 below shows that the high DSV alone separates alfin plus from all other hydrocarbon rubbers used commercially. It is the only one that has a viscosity higher than natural rubber. In addition, as far as the study on this new plateau of activity has progressed, the proportion of vinyl structure is usually higher than in any other rubber except Buna, which has a very low viscosity. Alfin plus is also distinct from any ordinary alfin rubber of high viscosity. It is compoundable, whereas the old alfin is not. Furthermore, as far as is yet known, the percent of vinyl structure tends to be higher and the trans/vinyl ratio lower than in alfin; but the division is narrow. So the microstructure might not really characterize alfin plus rubber. However we do not know that millability is really dependent on the microstructure, for high end fractions are credited with effecting shear breakdown of natural rubber and SBR [See Bueche, J. Applied Poly. Sci., 4 101 (1960); Kraus and Rothmann, Rubber Chem. and Tech., 38 493 (1965)]. So the major characterization of this new rubber is its millability in spite of its high viscosity, irrespective perhaps of its microstructure. That unique situation contrasts with the facts for the low molecular weight commercial synthetic rubbers. Their millability is affected greatly by the microstructure, according to Blumel, (loc. cit.). The discovery of high viscosity polymers that can be compounded easily is a unique achievement in polymer research.

Not only is the product unique, so is its preparation. During the 25 and more years since the discovery of the alfin catalyst, all of the customary variations known to polymer science have failed to improve the millability of the high DSV alfin rubbers to the point where they can be compounded on a mill as are commercial rubbers. The methods used in this invention are unique and contrary to the general opinion about safety and good practice in the rubber industry. As one item, the filling of the container 90% for an adiabatic process that is extremely fast in a low boiling medium such as pentane would be thought an invitation to an explosion. There is too much heat in too short a time for safety. The second item — the use of even more catalyst which would make the reaction go even faster — is uneconomical as well as more hazardous; it violates the principle of the maximum yield per minimum catalyst. Yet the process has proven to be entirely safe. Possibly part of the heat of polymerization is taken up by the work of expansion of the shell as new polymer forms under and against the shell.

All in all the chemistry seems not so much the long established chemistry of monomer and catalyst in solution. Rather it is the chemistry of the solid particle — the maximum use of the surface for polymerization and the relative freedom of that surface to function effectively. These features dominate and are as unique as the product.

pany a low v/l ratio in an advantageous commercial operation.

To cover this situation of nearly equivalent and closely integrated and complementary processes we are using the term "advantageous polymerization." The term signifies that the catalyst particle is used to full advantage as a polymerization agent. No longer is a large part of the surface diverted to mere boiling stone activity. No longer is the surface under the shell allowed to be heated excessively so that side reactions occur and large amounts of tough gel form. The particle is used, as far as possible, only for polymerization. Thus a high DSV, high quality, rubber can be obtained with an alfin catalyst. Examples 9 to 12, inclusive, of this invention were carried out under a condition of "advantageous" polymerization. Further refinements and extensions to achieve higher quality or economy are possible under this general principle which uses to Table 4

Some Characteristics of Commercial Hydrocarbon Rubbers and Alfin Plus Rubber

| Rubber | Microstructure | | | DSV | Ref.[a] |
|---|---|---|---|---|---|
| | Cis % | Trans % | Vinyl % | | |
| Natural | 96 | | [4] | 5.2 | B1 |
| Cis Poly Bd.[b] | 85–98 | 1–14 | 1–5 | 1.8–3.0 | B1 |
| Cis Poly Bd.[c] | 89–98 | 1–14 | 1–5 | | Ba-1 |
| Cis Poly Bd. (Ti) | 92 | 4 | 4 | 3.1 | Ba-2 |
| Cis Poly B. (60°) | 57 | 29 | 14 | | Ba-1 |
| BuLi[d] | 34–58 | 37–55 | 7–12 | | Ba-1 |
| BuLi | 36 | 54 | 10 | 1.9 | Ba-2 |
| BuLi[e] | 41–42 | 49 | 9–10 | 2.6–2.9 | B1 |
| Emulsion Poly Bd.[f] | 4–19 | 60–77 | 17–21 | | Ba-1 |
| Emulsion Poly Bd. | 9 | 72 | 18 | 2.2 | Ba-2 |
| Cold Rubber | 15 | 69 | 16 | 2.2 | B1 |
| Redox | 10 | 70 | 20 | 2.7 | B1 |
| Na(bulk) Buna | 20 | 40 | 40 | 2.1 | B1 |
| Alfin[g] | 7 | 70 | 23 | [10–12][h] | Ba-1 |
| Alfin, modified | 2 | 76 | 22 | 3.1 | Ba-2 |
| Alfin plus[i] | 12 | 54 | 30 | 10–12 | |
| Alfin plus[j] | 6–9 | 60–66 | 17–29 | 13–17 | |

Footnotes to Table 4
[a]B1. means Blumel, Table 1 on p. 412 in Rubber Chem. and Tech. 37 408 (1964)
Ba-1 means Table A-1, Bahary et al, Rubber Chem. and Tech. 43 1529 (1967)
Ba-2 means Bahary et al ibid. Table 2 on p. 1533 and Table 3, p. 1536. 43 1529 (1s967)
[b]Range of nine preparations
[c]Range of 13 preparations
[d]Range of 5 preparations
[e]Range of 3 preparations
[f]Range of 9 preparations
[g]Average of four listed
[h]This value is not listed in the paper by Bahary et al. A value of 10 to 12 is common for alfin polybutadiene. A value of around 8.5 is obtained in 30:70 SB copolymerization.
[i]Value for preparation No. 9 in Tables 1 or 2 of this disclosue.
[j]Range of values obtained in Examples 9–11 in this disclosure.

In all probability and very advantageously the three methods of repressing boiling and thus providing more catalyst surface for polymerization would be used in every preparation of millable high DSV alfin plus rubber. Conceivably, though unlikely, a combination of low v/l ratio and large amount of catalyst might be used; but to use pressure and a large amount of catalyst in a container only 70% full, would seem incredible. The most practical preparation of a unique rubber would thus be avoided, purposely and uneconomically. Actually the three methods are closely integrated. The initial realization that a low v/l ratio is important is essentially a realization that reduction or elimination of boiling stone activity by the catalyst particle is important and naturally leads to the thought of less boiling achieved by an increase in pressure. And because boiling per particle is necessarily reduced by an increase in the quantity of catalyst and/or by the application of pressure, these two methods must be regarded as equivalents to the low v/l ratio. They unavoidably accompany advantage the unique capacity of the catalyst for polymerization.

SOME OBVIOUS APPLICATIONS OF THIS DISCOVERY

The changes wrought by this discovery are inherent in the low v/l ratio and in its equivalents and in the better utilization of the catalyst surface. The particular pair of monomers used in the experiments merely brings to light these factors. No similar result has hitherto been reported. So "advantageous" polymerization is a new and unique aspect in this field of polymer chemistry. And the demonstration with butadiene and styrene illustrates, but does not limit, the obvious possibilities from this discovery of a way to increase activity in both degree and kind, and to improve quality. This extra activity signals a wide range of possible effects. For example, a vinyl structure comes from a 1,2-pattern of chain growth, which is the form needed for polymerization of olefins. Those hydrocarbons have been largely unaffected by the alfin reagent. But on this new plateau, where chain growth is rapid and to high molecular weight, the path seems open to the incorporation of olefins with the butadiene. Possibly such monomers might replace styrene or, more reasonably, might be used in conjunction with styrene to modify the butadiene polymer. And, of course, isoprene can be used in place of butadiene. The combination of butadiene and styrene merely happens to be an economical and presently the most used pair in the making of synthetic rubber, and in this instance is used to make a useful rubber of higher DSV than any currently being prepared. But the way is opened to the preparation of other rubbers.

The road is also opened to the use of crude butadiene as it comes from the cracker. This idea is mentioned in the paper by Stewart and Williams (loc. cit.) in their work on alfin SB copolymers. Under those early conditions the use of crude butadiene served no other purpose than economy; the quality of the rubber was too low for practical use. But in the present "alfin plus" process the use of crude butadiene should prove economically valuable with the added possibility of incorporation of butene-1 and/or butene-2 — an effect which should be proven by infra red absorption or equally reliable measurements.

This entrance into the field of extremely high molecular weight rubbers presages extensive research, because high molecular weight is acknowledged (see a recent review published in the July 14, 1969 issue of Chem. and Eng. News, p. 57) to be an important factor in improving tread wear and resistance to cracking in tires. Molecular weights and DSVs are not precisely equivalent. Yet Hansley and Greenberg (10c. cit.) credit alfin rubbers with molecular weight in the order of 5 million. Natural rubber is around 2.5 million according to Blümel (loc. cit.) SBR and the other synthetic rubbers are in the 250 to 300 thousand range.

In spite of the awareness of the importance of high molecular weights, nothing practical in that field has been done in the 25 years since the discovery of the alfin catalyst. Numerous efforts to prepare these high DSV polymers in a usable form have failed. The present discovery breaks that barrier. And the almost infinite number of composition variables of quantity and kind that is possible with these solid reagents can be put to work in the never ending effort to get superior rubbers. The particular examples given in this disclosure point the way and are a demonstration of the possibilities on this new plateau of activity.

Copolymerizing butadiene and styrene is therefore only representative of polymerization accomplished through the typical group and there is every reason to believe that reduction of boiling per particle and the more effective use of the area on each particle — things that characterize this invention — can be applied equally well to other hydrocarbon monomers thus joined in polymers. Limits on time and capital obviously preventing our developing specifications for all systems; others skilled in the art can enlarge and economize the system as they may desire.

RECAPITULATION

The description of this invention has been given in great detail, as is warranted by the uniqueness of a millable synthetic rubber of extremely high viscosity — the first of its kind. But a review of the steps in the discovery and application of the invention is worth while. Under the section entitled "Experiments Pertinent to the Discovery" is an account of the experiments that led to the discovery of a v/l effect (Experiments 9–12 in Table I). The inventors realized at once that the catalyst particles had been serving as boiling stones as well as centers for polymerization. So the prime aim after that time was to reduce boiling, which is really desorption of monomer. It was realized that pressure would be another way to reduce boiling but the inventors lacked the necessary equipment. But they made an effort to improve on the original discovery by increasing the amount of catalyst and reducing the time (Experiments 13 and 14). Increasing the amount of catalyst would reduce the proportion of the total area devoted to boiling, but would increase the proportion devoted to polymerization, other factors being equal. This change might be described as a decrease in the ratio of boiling/polymerizing areas. The improvement was marked. The products banded on a warm mill.

Next the temperature was lowered because boiling is always less at lower temperatures. Again an improvement was noted (Experiments 15 and 16). The yields were low but that could be remedied by an increase in the amount of catalyst, as was mentioned in Footnote j in Table 1.

Our original application was filed at that point. But one more experiment was made (No. 17) in which the apparatus was 90% full. The reaction was unexpectedly fast (see FIG. 3) and the product was not as good as the others. But the importance of the Y/C ratio as a numerical index of quality was perceived as shown in Table 3. Also the need for more catalyst to reduce the thickness of the shell about the particle was realized, but a much larger amount of catalyst would have been used anyway because a low initial temperature requires the use of more catalyst.

Attention was next directed toward applying the information in a practical way. The four items that would reduce boiling were featured. These were the low v/l ratio, the large amount of catalyst, a low temperature, and such increase in pressure as could be achieved by addition of the catalyst suspension (the monomer could have been added instead) from a syringe through the rubber sealed stopper. This four-fold reduction of boiling was outstandingly successful. All of the polymers except the one in Example No. 11 (which stood too long after the polymerization was completed) had gel less than 10% (Examples 9–12), whereas the gels recorded in Table 1 ranged from 15 to 47%. Moreover the rubber compounded nicely in a conventional formula. The cured stock had very good tensiles and elongations.

Three of these decreases in boiling have been superimposed upon the original one, the v/l effect. Therefore it is clear that the decrease in boiling must at least be that achieved by a v/l ratio less than 0.2, and preferably less than 0.15. And it is clear that this level of reduction of boiling must be achieved by any combination of these methods or of any other obvious ways to reduce the boiling stone activity of the catalyst particles.

We therefore set forth below under Appendix A only the specific procedures for some preferred examples, adequate for a disclosure of the v/l effect and the way to get high quality, high DSV, alfin plus rubbers by "advantageous" polymerization.

With regard to Appendix I, attention is directed to Examples 9 and 12 where the factors, such as a low v/l ratio, followed by more catalyst and lower temperature, which led to progressive improvements in Experiments 9–16 in Table I, were increased further. Thus the v/l ratio was around 0.09, the proportion of catalyst was doubled (and the reaction time correspondingly reduced), and the temperature was lowered, and maintained lower by a bath. Moreover, a modest pressure was imposed by injecting the catalyst suspension after the reaction vessel was capped. All of these changes would further reduce the boiling per particle, which is the prime effect in this invention. Each catalyst particle operates more effectively as a polymerizing agent and less effectively as a boiling stone and in side reactions.

The properties of the resultant products as soft rubber were compared to those for known rubbers in soft rubber recipes as reported by Blümel:

TABLE 5

|  | Tensile kg/cm$^2$ | Elongation % | Viscosity[1] |
|---|---|---|---|
| Alfin "plus" rubber |  |  |  |
| Example No. 12 | 277 | 470 | 12.8 |
| Example No. 9 | 257[4] | 520 | 13.1 |
| Nippon alfin rubber[2] | 166 | 590 | 3.1 |
| Natural rubber | 260 | 530 | 5.2 |
| Cold rubber | 227 | 505 | 2.2 |
| Redox rubber | 167 | 355 | 2.7 |
| Cis Polybutadiene rubber | 148–169 | 435–555 | 1.8–3.0 |
| Solution (Li) rubber[3] | 130–145 | 405–455 | 2.6–2.9 |
| Buna rubber | 117 | 365 | 2.1 |

Footnotes
[1]For the rubber per se, not the soft rubber composition. The alfin rubber values are "intrinsic"; the remainder are DSV values. [2]The rubber (commercial) of Greenberg Pat. No. 3,067,187, made by Nippon Alfin.
[3]The lithium catalyzed rubber of which the LiK agent referred to in Diem Pat. No. 3,049,528, is a variation.
[4]3650 psi The recipe used by Blümel was not the same as that used for the alfin rubbers as is seen in Table 6 below. Thus the tensiles and elongations shown in Table 5 are not strictly comparable. Blümel, of course, would certainly not choose the worst condition for his comparisons. The larger amount of carbon black in our recipe would impart more tensile strength, but the larger amount of oil reduces tensile strength, so the comparisons seem valid for all practical purposes. The significant point is that the rubber of Example 9 and 12 rated so well, in one case above natural rubber, on a more or less chance choice of recipe for compounding as soft rubber. Such an unusual result would be possible only if the incorporation (dispersion) of the reinforcing agent, carbonblack, was relatively easy and good during compounding. The high tensiles are significant evidence that a major barrier to the use of alfin rubber has been broken by the present invention.

Table 6

|  | Blümel | Alfins (Examples 9 and 12 herein) |
|---|---|---|
| Rubber | 100 | 100 |
| Carbon black | 47.5 | 60 |
| Plasticizing oil[1] | 8 | 15 |
| Zinc oxide | 3 | 3 |
| Stearic acid | 2 | 2 |
| Sulfur | 2 | 1.5 |
| Amines | 2 |  |
| Wax | 1 |  |

Table 6-continued

|  | Blümel | Alfins (Examples 9 and 12 herein) |
|---|---|---|
| Accelerator | 1 | 0.9 |
| Cure temp. °C | 145 | 145 |

[1]Aromatic processing oil

In this discovery only one alfin catalyst — allylsodium, sodium isopropoxide and sodium chloride — has been used. It is universally regarded as the most typical member of the group. A wide number of combinations can be used; see Avery A. Morton in the first three references in the first paragraph of the section entitled "Experiments Pertinent to the Discovery." For example, in place of allylsodium, such reagents as butenylsodium, pentenylsodium, benzylsodium and xylysodium could be used. Variations in the alkoxide and the halide or pseudo halide salt can be made. The proportions of the three salt components can be varied. Also the catalyst can be supported on another reagent such as naphthylsodium (the $A_n$ catalyst in Table 1) or on phenylsodium or other suitable base.

However, all alfin catalysts should show a v/l effect. They cannot do otherwise because all alfin catalysts are solids; all cause polymerization on the surface of the solid. Polymerization generates heat. Therefore, all catalysts generate heat on the particle. Indeed, the particle can, in a way, be regarded as a small furnace. Therefore, all catalysts particles will serve also as boiling stones and will drive (distill) adsorbed monomer from the surface unless the boiling stone activity is repressed. That repression will keep monomer on the surface so that more polymerization will occur. Therefore the yield and viscosity will increase. And if the repression is done properly, as we described in the disclosure, the quality of the rubber will be increased. There should be no exception to this situation.

Therefore the use of allylsodium, sodium isopropoxide and sodium chloride in the disclosure of this invention, illustrates, but does not limit the scope of this invention. It is entirely possible that some other member of this series of catalyst may utlimately prove better for industrial use.

In Appendix II we set forth (1) a consideration of the past history of ordinary (unmoderated) alfin rubber from the standpoint of inability to mill or compound that rubber on a commercial scale under soft rubber conditions and (2) a definition of compoundability (and therefore a millable rubber) met by the rubber of the present invention.

APPENDIX I

Example No. 1 (Experiment No. 9 in Table I)

From a stock solution of butadiene in pentane, 288 ml., containing 38 ml. of butadiene, was poured into a dry 12 oz. tonic bottle which had been filled with dry nitrogen. When the mixture had warmed until bubbles (presumably butadiene) were just beginning to rise from the solution, 10 g. of styrene was added, followed immediately by 10 ml. of a suspension of A catalyst (under nitrogen) which had been prepared as described in footnote (a) of Table I. The bottle was capped and skaken for one hour. Then the bottle was opened and the contents emptied into approximately 150 ml. of alcohol containing some antioxidant. The precipitated rubber was stirred to insure decomposition of all active sodium salts. About 100 ml. of water was added to facilitate coagulation. As the pentane evaporated the rubber became attached as a sticky glob to the stirring rod. Eventually the mass was removed, washed in a stream of water, and kneaded by hand to press out water and pentane. Finally the rubber was pressed between paper and dried under vacuum at room temperature to constant weight. The yield was 21 g. The DSV was 12.7. The gel was 15%. Spectroscopic analysis showed 24.4% trans-1,4-structure, 19.7% of cis-1,4-structure, 21% of 1,2-structure, and 34.9% of styrene. On a micro mill this rubber crumbled slightly, but banded on a hot mill.

EXAMPLES NOS. 2, 3 AND 4 (NOS. 10, 11, AND 12 IN TABLE I)

These preparations were made in the same way as in Example No. 1, but with gradually increasing quantities of $A_n$ catalyst in order to introduce smaller proportions of higher molecular weight polymer than could be obtained with A catalyst alone (for at that time we expected that the DSV would be decreased under the L condition and we wanted to insure that a small proportion of the polymer product would have relatively long chains, the earlier experiments having indicated that the $A_n$ catalyst produced a polymer with higher DSV than did the A catalyst). The operations were carried out exactly as Example No. 1 except that 10 ml. of previously mixed catalyst (under an atmosphere of nitrogen) was added. The mixtures were in the proportions of 50:1, 22:1, and 13:1 A:$A_n$ respectively for Examples 2, 3 and 4. In other words the amounts of $A_n$ catalyst were respectively 2.0, 4.4, and 7.1%. After the one hour reaction time and decomposition, the yields were in each case 21 g. Actually part of No. 2 was lost, but the reasonable assumption is that the yield was 21 g, because the conditions were identical with No. 1 except for the 2% of $A_n$ catalyst. Also the four examples, 1, 2, 3, and 4, were run in succession on the same day. The DSVs were respectively 13.9, 12.7, and 15.1. In other words two of these three experiments gave a higher DSV than was found in Example No. 1. Only Example No. 3 failed to show a higher value for some unexplained reason. The respective gels were 21, 14 and 21%. The spectrographic analysis of No. 2 showed 18.8% of trans-1,4-structure, and 39.4% of styrene. As in the case of No. 1 the three polymers crumbled slightly on a cold mill, but banded on the hot mill. As might be expected from the higher DSV they were a little less satisfactory than No. 1.

EXAMPLE NO. 5 (NO. 13 IN TABLE I)

This preparation was made in the same way as No. 1 except that 12 ml. of A catalyst instead of 10 ml. was used and the time was 52 minutes instead of one hour. The yield of dry polymer was 22 g. The DSV was 12.0. The gel was 35%. The styrene content was 25.9. This polymer masticated without crumbling and banded as the mill warmed. The DSV and gel values after milling were 6.5 and 21% respectively.

EXAMPLE NO. 6 (NO. 14 IN TABLE I)

This preparation was identical with No. 5 except that 14 ml. of catalyst was used and the reaction time was only 45 minutes. The yield of dried polymer was 26 g. with DSV of 11.9 and gel of 47%. The bound styrene was 25.8%. The product masticated without crumbling and banded as the mill warmed. After milling the DSV was 8.1 and the gel was 17%.

EXAMPLE NO. 7 (NO. 15 IN TABLE I)

This preparation was the same as No. 5 except that the initial temperature was lower, probably by 20° C and the time was 65 minutes. The lower initial temperature prevented the reaction from getting a good start. So the yield of the dried product was only 16 g. The gel was 11.5%. The rubber did not crumble on the mill but the amount was too small to detect banding.

EXAMPLE NO. 8 (NO. 16 IN TABLE I)

This preparation was exactly the same as No. 7 except that the time was 75 minutes. Again the yield was low, only 11 g. The DSV was 10.7. The gel was 32%. The amount was too small to band around the micro mill but appeared satisfactory otherwise.

EXAMPLE NO. 9

The alfin catalyst for this example was made by the metalation of propylene with butylsodium in the presence of sodium isopropoxide so that the mole proportions of allylsodium, sodium isopropoxide and sodium chloride were approximately 1:1:1, whereas the proportions in the previous preparations were approximately 1:1.7:3. A suspension of this catalyst, 77 ml., was added from a syringe through a rubber-metal cap to a solution of 98 ml. of butadiene and 30 ml. of styrene in 665 ml. of pentane in a 32 oz. pressure bottle previously cooled to 35° F. The vapor space in this reaction vessel was about 8%. The bottle was rotated in the cooling bath for 9.5 minutes. The mixture had thickened appreciably, although it was not the usual stiff jelly obtained in ordinary alfin preparations. Some alcohol was added from a syringe through the cap. The bottle was shaken by hand to kill the catalyst and stop the reaction. When that action seemed complete the bottle was set aside to await recovery of the rubber. Apparently, however, some of the reagent in the center of the thick mass had not been decomposed, because some time later, perhaps half an hour, the bottle was noticeably warmer, though not hot. Upon further decomposition and recovery of the rubber, 70 g. (80% yield) was obtained. It was completely soluble in toluene at 30° C. The intrinsic viscosity in toluene at 30° C was 13.1. Styrene content, 28%. The proportions of trans, vinyl, and cis structures were respectively, 65, 29, and 6%. The trans/vinyl ratio was 2.2.

This preparation and the ones that follow incorporate the principles set forth in the disclosure for getting a high quality rubber. The vapor space was around 8% which was lower than in the previous cases. The amount of catalyst per monomer was higher, possibly by twice. The introduction of the catalyst suspension after the bottle was capped raised the pressure around twice. The initial temperature was low.

The rubber thus obtained was compounded on a small mill in the formula: rubber, 100; carbon black, 60; Circosol (oil), 15; zinc oxide, 3; stearic acid, 2; sulfur, 1.5; Santocure, 0.9. The rubber banded easily on the mill and compounding progressed smoothly on a warm mill. The compounded stock was cured for 50 min. at 145° C. The cured stock had a tensile, 257 kg/cm$^2$ (3654 lbs/in$^2$); elongation 520%, 100% modulus, 21 kg/cm$^2$; 300% modulus, 106 kg/cm$^2$.

EXAMPLE NO. 10

This preparation was exactly the same as No. 9 except that only 65 ml. of catalyst suspension was used and the bath temperature was 20° F. The bottle was removed from the bath after 20 min. Alcohol was added to stop the reaction. The covered rubber (45 g. or 51%) had properties similar to No. 9. The styrene content was 28%. The solubility in toluene at 30° was 93%; intrinsic viscosity 16.5. The proportions of trans, vinyl, and cis structures were respectively 66, 29, and 6, almost identical with the proportions in No. 9.

EXAMPLE NO. 11

The operation was exactly the same as in No. 10 except that the bottle was rotated in the 20° F bath for 19 hrs. At the end of that time the rubber was an insoluble mass. The liquid was clear and transparent. The yield of recovered rubber was 89 g., slightly over 100%, due no doubt to some occluded matter. The rubber was 67% soluble in toluene at 30° C. The intrinsic viscosity of the soluble portion in toluene at that temperature was 13.6. The styrene content was 28%. The trans, vinyl and cis arrangements were respectively 64, 27, and 9% as measured on the soluble portion. These values are not far from those of No. 9 and No. 10. The higher percentage of gel was no doubt due to prolonged contact of the rubber with the active reagent after polymerization was completed.

EXAMPLE NO. 12

A reaction similar to No. 9 was terminated after 7 minutes rotation in the 35° C bath. The yield of recovered rubber was 16.8 g. 19%. Another similar run, but terminated after 5 min., yielded 13.5 g., 15%. Still another run for 5 min. yielded 21.5 g., 24%. These products, together with two more made with reagent in a smaller bottle but with the same relative proportion of reagents (yields 18 and 36%) were combined and compounded in the same recipe mentioned under Example No. 9. Banding was slightly slower but carbon black was taken up a little more easily. Curing was at 145° for 50 min. as before. The tensile was 277 kg/cm$^2$ (3939 lb/in$^2$; elongation 470%, 100% modulus, 26 kg/cm$^2$; 300% modulus, 139 kg/cm$^2$. The intrinsic viscosity of other preparations under roughly these conditions ranged from 12 to 15.

In general the rubber from the first quarter of the polymerization was much the same as from the preparation that yielded 80%. It is clear that rubbers can be compounded nicely if prepared under the conditions specified by the disclosure of this invention even if the viscosities are far above the viscosities of any hydrocarbon rubbers now used commercially.

APPENDIX II

Milling and Compounding

In the soft rubber goods industry the term "milling" is often applied to banding on the mill during which time the raw rubber is made plastic. In the subsequent compounding carbon black, processing oils and ingredients for vulcanizing are dispersed in the plasticized rubber. These steps can nearly always be effected to some degree with highly intractable rubbers if the time for plasticizing is exceedingly long and huge quantities of oil (50 or 100 phr) are somehow introduced, usually before milling, but the end product, particularly in the case of the high molecular weight alfin rubber, has hitherto been unsatisfactory. For this invention the words "milling" and "compounding" are used in the practical sense, where the operation of plasticizing can be completed without oil in a reasonable time and where compounding is by a recipe commonly used in the manufacture of soft rubber goods, such as tires. If these operations progress smoothly the tensiles, with appropriate elongations, should be in the upper bracket for synthetic rubbers in accord with expections for an unusually high molecular weight rubber.

In the past alfin rubber has failed miserably in these aspects. Taft, in "Synthetic Rubber" (Whitby ed.) John Wiley and Sons, New York, 1954, p. 750, stated that "The difficulties in the practical use of alfin polymers arise from the very high molecular weight and toughness Attempts to regulate the polymerization by any of the conventional means have so far been unsuccessful." Gaylord and Mark in "Linear and Stereoregular Addition Polymers," Interscience Publishers, New York, 1959, p. 233 stated that "The butadiene [rubber] prepared — with the standard alfin catalyst — has an extremely high molecular weight and is consequently very difficult to process." Greenberg and Hansley, U.S. Pat. No., 3,067,187, Dec. 4, 1962 repeated this criticism of alfin rubber being "very difficult to process using conventional equipment and conventional procedures" and disclosed their discovery of moderators that kept the chain lengths at the same conventional low levels (DSV around 2 or 3) for commercially compoundable stock.

Recently Hedman and Hubbard, U.S. Pat., No. 3,422,080, Jan. 14, 1969 stated that a high molecular weight alfin copolymer of butadiene with butene-2 "will process exceedingly well with or without processing oil." But the only type of compounding they described was for a hard rubber composition where 10% of rubber is a binder for 65% of coal dust as a filler together with other additives such as sulfur, lime, amines and magnesium oxide. The tensiles and elongations (1850 psi and 6.5%) are such as are found in hard rubber products and the company business (The Richardson Company) is in that field. The original application for the Hedman-Hubbard patent was filed eleven years before it was granted, and had they been able to develop soft rubber suitable for tires they would have emphasized that fact, for the production of hard rubber is trifling compared with that for rubber tires. The good band or sheet they mentioned was used as a bonding agent for 90% of other material and is clearly not a plasticized and softened rubber band in which carbon black and other ingredients can be evenly dispersed in the manufacture of soft rubber goods.

In addition to this silence on such an important matter, other evidence confirms the conclusion that Hedman and Hubbard made no contribution to the soft rubber industry. Anderson's excellent review article entitled "Rubber. A Billion Dollar Industry" published in Chem. and Eng. News, July 14, pp 39–83, 1969, made no mention of alfin rubber although the desirability of higher molecular weight rubber was mentioned. A little later in the same journal, Oct. 27, p. 46, 1969 the construction of a plant to produce the modified alfin of Greenberg and Hensley in Japan (Nippon Alfin) was featured, and again the unsuitability of unmodified alfin rubbers in commercial processing was stressed. Still more recently, Kienle, Dizon, Brett and Eckert in Rubber Chem. and Tech., 44 Sept. 1971, p.

996 published an excellent study of "Tread Wear and Wet Skid Resistance of Butadiene-Styrene Elastomers and Blends." The "Hytrans" alfin rubber of Greenberg and Hensley was tested but no mention whatever was made of an unmodified high molecular weight alfin, or for that matter of any really high molecular weight rubber. The twelve synthetic rubbers tested in their study had intrinsic viscosities of no higher than 3.

It is clear that the use of high molecular weight alfin rubbers in soft rubber goods is accepted as a dead issue; that has been the state of affairs since the extensive work of Taft mentioned above. And the same conclusion can be drawn from the papers by D'Ianni et al and Stewart and Williams mentioned in the third paragraph of this disclosure.

Accordingly, and by all facts known to the present inventors, we state that high molecular weight alfin rubbers have never been successfully used for soft rubber goods under commercial conditions. But by our invention we can get high molecular weight alfin rubbers which, without oil, can be plasticized by milling and banded within one or two minutes. Thereafter carbon black, oil and other necessary ingredients can be dispersed in the softened rubber during compounding. The tensiles of the cured product can be at least 3650 psi with elongation around 500%. Such values demonstrate effectively the preparation of a high quality rubber of high molecular weight. Eventually higher tensiles with appropriate elongations will no doubt be obtained. Alfin rubbers with still higher DSV will be prepared some of which will be plasticized without oil but others will be used in the preparations of oil extended alfin rubbers. All these things are merely the normal development expected of a new and very unusual rubber.

Incidentally the time and temperature for making the compounded stock in Examples 9 and 12 seem well within those recorded by Blümel in Table V, p. 418 of his paper (icc. cit). He used an internal mixer for comparing 15 synthetic commercial rubbers having DSVs that ranged from 1.8 to 3.0 together with natural rubbers (DSV, 5.2). He records a minimum compounding time that ranged from 8 to 12 minutes (ours was around 10) and a discharge temperature that varied from 110° to 155° C (ours is described as a warm mill, i.e. below 140° C). While these comparisons are very gratifying, we regard, as our main contribution, the preparation of a high molecular rubber that can be plasticized by milling so that carbon black and other ingredients can be effectively dispersed in the solid mass, as if in a highly viscous fluid, characteristic of the plasticized state. The time and temperature are important, but may vary with the amount and kind of carbon black as well as other factors.

We claim:

1. An alfin catalyzed rubber, selected from the group consisting of butadiene homopolymer and butadiene-styrene copolymer, of DSV greater than 9 and which compounds as soft rubber on a rubber mill after no more than about 15 minutes of mixing in the presence of no more than about 15 phr processing oil added on the mill, and being dischargeable from the mill at a temperature of no more than about 145° C said rubber having been made by polymerization in a closed reaction chamber in which the internal pressure during reaction corresponds to a vapor/liquid ratio of less than about 0.2.

* * * * *